United States Patent
Yamatsuta et al.

[11] Patent Number: 5,139,551
[45] Date of Patent: Aug. 18, 1992

[54] METHOD OF PRODUCING SPHERICAL PRODUCTS

[75] Inventors: Kiichi Yamatsuta; Shoji Goto, both of Kanagawa; Satoshi Shimizu, Sagamihara, all of Japan

[73] Assignee: Asahi Fiber Glass Company Limited, Tokyo, Japan

[21] Appl. No.: 818,468

[22] Filed: Jan. 6, 1992

Related U.S. Application Data

[63] Continuation of Ser. No. 530,430, Jun. 1, 1990, abandoned, which is a continuation of Ser. No. 337,878, Apr. 14, 1989, abandoned.

[51] Int. Cl.⁵ .............................................. C08P 19/10
[52] U.S. Cl. ................................... 65/21.2; 65/21.1; 65/142; 264/8
[58] Field of Search .................. 65/21.1, 21.2, 21.3, 65/141, 142, 6, 7, 8; 264/8

[56] References Cited

U.S. PATENT DOCUMENTS

| | | | |
|---|---|---|---|
| 2,616,124 | 11/1952 | Lyle | 65/142 |
| 2,908,036 | 10/1959 | Russell | 65/12 |
| 3,279,905 | 10/1966 | Wood et al. | 65/21.2 |
| 3,282,066 | 11/1966 | Searight | 65/141 |
| 3,293,014 | 12/1966 | Callander et al. | 65/21.2 |
| 3,843,340 | 10/1974 | Cone | 65/21.2 |
| 3,907,537 | 9/1975 | Irgens | 65/142 |
| 4,303,433 | 12/1981 | Torobin | 65/21.4 |
| 4,392,879 | 7/1983 | Takeuchi et al. | 65/8 |
| 4,601,742 | 7/1986 | Kaveh | 65/6 |
| 4,668,265 | 5/1987 | Gaul | 65/8 |
| 4,808,097 | 2/1989 | Takahashi | 264/8 |

FOREIGN PATENT DOCUMENTS 1696586 2/1970 Fed. Rep. of Germany .
2249049 5/1975 France .

Primary Examiner—Kenneth M. Schor
Attorney, Agent, or Firm—Oblon, Spivak, McClelland, Maier & Neustadt

[57] ABSTRACT

Spherical products of a heat-softened material are produced by supplying a molten heat-softened material into a C-shaped channel-like spinner with an open upper surface and a large number of orifices formed in its circumferential wall, at a rate of 0.020 kg/hr or lower per a single orifice of the spinner; rotating the spinner at a high speed to form cone-like fine streams of the molten material from the orifices by means of a centrifugal force; and flowing streams of a hot gas so as to traverse the fine streams of molten material to thereby heat the same resulting in reducing the viscosity of the molten material and to break the fine streams by the hot gas streams.

7 Claims, 1 Drawing Sheet

METHOD OF PRODUCING SPHERICAL PRODUCTS

This application is a continuation of application Ser. No. 07/530,430, filed on Jun. 1, 1990, which is a continuation of Ser. No. 07/337,878, filed Apr. 14, 1989, both now abandoned.

BACKGROUND OF THE INVENTION

1. Field of the Invention

The present invention relates to a method of producing spherical products such as glass balls.

2. Discussion of the Background

Glass balls are prepared by melting particles of glass by heat, forming the molten glass into spherical products through the action of surface tension and cooling the spherical products. In this case, in order to prevent thus obtained glass balls from melt-bonding to each other, various proposals have been made. For instance, the glass particles are mixed with carbon powder and the mixture is heated so that the disadvantage of a mutual melt-bonding phenomenon can be avoided. However, the conventional techniques have the problems as follows.

(1) Operations are troublesome and productivity is low.

(2) The size of the spherical glass products is determined by the size of the glass particles used. However, it is difficult to obtain the glass particles having a size correctly in a predetermined range. For this reason, operations such as classification or screening are needed to obtain the spherical glass products having a predetermined size. As a result, the yield may be reduced.

As other proposals, there are a method wherein a hot gas is blown through molten glass streams at a high speed to break the glass streams so that the broken glass streams are formed into spherical bodies by the action of surface tension (Japanese Examined Patent Publication No. 20713/1967 and Japanese Unexamined Patent Publication No. 24596/1967) and a method wherein molten glass is formed into a thin film, a hot gas is blown to the thin film molten glass at a high speed to break the same, whereby the broken pieces of molten glass are formed into spherical products by the action of surface tension (Japanese Examined Patent Publication No. 27086/1974). However, it is difficult to obtain spherical glass products having an extremely small diameter and having a uniform size.

Japanese Unexamined Patent Publication No. 27086/1974 discloses that molten glass is dropwisely discharged from a rotatable cylinder having fine gaps. However, this method is poor in productivity and it can not be employed as an industrial method.

Japanese Examined Patent Publication No. 27086/1974 discloses a method of producing spherical glass products by using a rotatable body which is provided with fine orifices through which molten glass is discharged dropwisely. However, when spherical glass products having a smaller diameter are to be produced, it is necessary to reduce the size of fine orifices in correspondence to the diameter of the glass balls. Accordingly, this method can not be employed as an industrial method.

SUMMARY OF THE INVENTION

The present invention is to eliminate the above-mentioned problems. Hereinbelow, description will be made mainly as to a method of producing spherical glass products.

Short glass fibers have been widely used for heat insulating materials and sound absorbing materials, and have been produced in a large scale. As a typical method of producing the short glass fibers, molten glass is supplied in a C-shaped channel-like spinner with an open upper surface and a large number of orifices formed in its circumferential wall, the spinner is rotated to produce a centrifugal force to thereby discharge streams of molten glass through the orifices while a hot combustion gas is blown to the circumferential surface of the spinner.

In the study to obtain glass fibers having a small diameter by using a centrifugal method, the inventors of this application have found that spherical glass products can be obtained by specifying operating conditions by using the centrifugal method to be in a specified range. Further, they have found that the method according to the present invention produces not only spherical products of glass but also spherical products of heat-softened material such as plastics.

It is therefore an object of the present invention to provide a method of producing spherical products of a heat-softened material such as glass having a small and uniform diameter in an industrial manner.

In accordance with the present invention, there is provided a method of producing spherical products of a heat-softened material which comprises:

a step of supplying a molten heat-softened material into a C-shaped channel-like spinner with an open upper surface and a large number of orifices formed in its circumferential wall at a rate of 0.020 kg/hr or lower per a single orifice of the spinner, a step of rotating the spinner at a high speed to form cone-like fine streams of the molten material from the orifices by means of a centrifugal force, and a step of flowing streams of a hot gas so as to traverse the fine streams of molten material to thereby heat the same resulting in reducing the viscosity of the molten material and to break the fine streams by the hot gas streams, whereby the broken fine streams are transformed into spherical products by surface tension.

DETAILED DESCRIPTION OF THE PREFERRED EMBODIMENT

Preferred embodiments of the present invention will be described with reference to the drawings.

Figure 1:
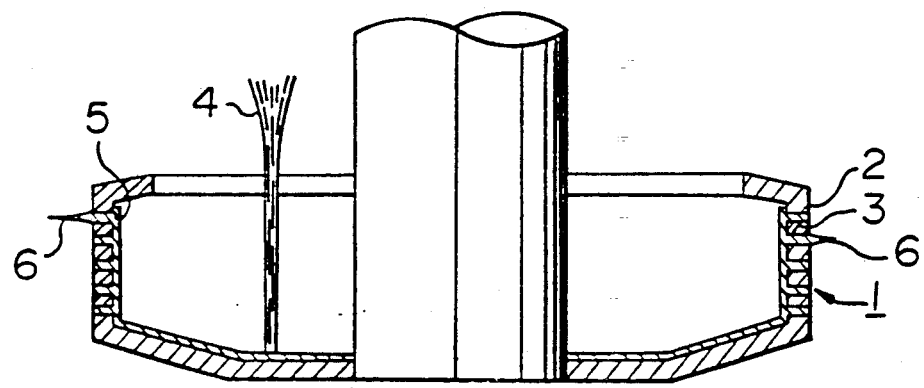
FIG. 1 is a longitudinal cross-sectional view of an embodiment of the spinner used for the present invention.
Figure 2:
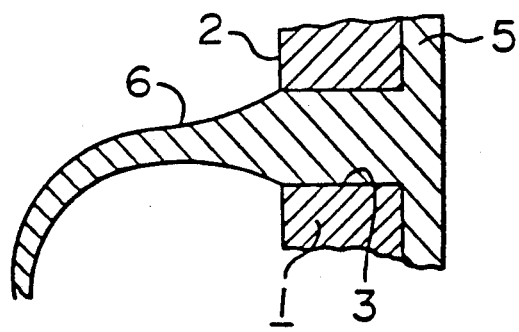
FIGS. 2 and 3 are respectively enlarged cross-sectional views of an important part of the spinner shown in FIG. 1.
Figure 3:
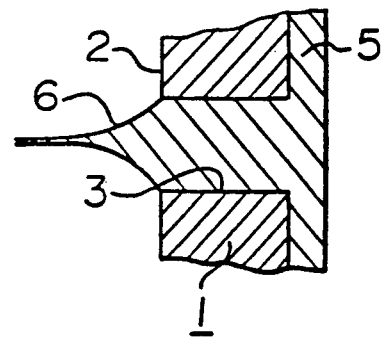

In FIG. 1, a spinner 1 constituted by a C-shaped channel-like member having the upper surface opened is used for the method of the present invention. The spinner 1 has a substantially vertical cylindrical circumferential surface 2 (hereinbelow, referred to as circumferential surface). The wall thickness of the circumferential surface 2 is preferably uniform, then, the spinner 1 can be easily manufactured. A large number of orifices 3 are formed in the circumferential surface.

The diameter of the orifices 3 is determined depending on the diameter of a desired spherical glass products. In accordance with the method of the present invention, the spherical glass products having a diameter ½-1/300 times as large as the diameter of the orifices 3 can be obtained. The diameter of the glass products can be selected by selecting the condition of operations described below.

Molten glass is supplied to the spinner 1 through a molten glass supplying conduit or the like (not shown) which is provided at the upper part of the spinner 1. In this case, a rate of a supply of the molten glass per hour is determined to be 0.020 kg/hr or lower per a single orifice in the spinner, preferably in a range of 0.01 kg-0.001 kg/hr per a single orifice in the spinner.

In the present invention, it is preferable that the number of the revolutions of the spinner 1 is determined to be in a range of 500 rpm-5,000 rpm, preferably 1,000 rpm-3,000 rpm, and the temperature of the molten glass is so determined that the viscosity of the molten glass to be supplied to the spinner 1 is in a range of 50 poise-4,000 poise, preferably, 100 poise-2,000 poise.

Due to a centrifugal force produced by the revolution of the spinner 1, the molten glass in the spinner 1 is discharged through the orifices 3 and is attenuated, so that club-shaped or cone-like fine streams 6 of molten glass are formed. A hot gas is blown to the fine glass streams 6 so as to traverse them, whereby the fine streams 6 of the molten glass are heated and the viscosity is rapidly reduced. As the hot gas stream, a hot combustion gas is preferably used. The hot combustion gas is supplied through a combustion gas feeder (not shown) opened at the upper part of the circumferential surface 2 of the spinner 1 to the downward direction along the outer circumference of the spinner 1.

In the centrifugal method to produce glass fibers by using the spinner in the conventional technique, the molten glass is discharged through the orifices formed in the spinner and the hot combustion gas is discharged downwardly along the outer circumference of the spinner in the same manner as the method of the present invention. As described before, the present invention uses the same spinner as used in a method for producing glass fibers; however, the condition of operations is specified in a specified range, whereby spherical glass products having a small diameter can be obtained with narrow distribution in diameter.

Detailed description will be made as to these specified conditions.

As the first condition, the molten glass is supplied at a rate of 0.020 kg or lower per hour with respect to a single orifice of the spinner, preferably in a range of 0.01-0.001 kg/hr. The molten glass 4 in the spinner 1 is subjected to a centrifugal force produced by the rotation of the spinner 1. As a result, the molten glass is urged to the inner side surface of the spinner so that a layer 5 of the molten glass is formed. Then, the molten glass 4 flows through the orifices 3 by the centrifugal force, whereby fine streames 6 of the molten glass of a tapered or a cone-like form are produced. The thickness of the molten glass layer 5 becomes larger as an amount of supply of the molten glass 4 is greater, whereby a driving force to cause the molten glass to discharge through the orifices 3 of the spinner 1 is large, with the result that relatively long and fine molten glass streams having a smaller top angle of cone are formed. When an amount of supply of the molten glass 4 is small, the thickness of the molten glass layer 5 is small to thereby reduce the above-mentioned driving force. Accordingly, relatively shorter fine molten glass streams 6 having a larger top angle of cone are formed. In the former case, the molten glass streams 6 are further attenuated by directing then downwardly along the direction of gas stream by a hot gas ejected downwardly, whereby glass fibers having a relatively diameter (about 7 μm in diameter) are formed. Under the above-mentioned condition, spherical glass products are not produced.

As the second condition to produce the spherical glass products, streams of a hot gas are blown so as to traverse the fine streams 6 of the molten glass so that the fine streams are heated to thereby rapidly reduce the viscosity of the glass. Such condition can be accomplished by increasing the temperature of the hot gas and by reducing a flow rate of the hot gas. The flow rate of the hot gas is preferably 50 m/sec or lower, preferably 40 m/sec or lower, most preferably in a range of 40-10 m/sec.

The temperature of the hot gas is preferably so determined as to be higher than 200° C.+T, more preferably in a range of T+300° C.~T+700° C. where T is an average temperature of the outer surface of the spinner (hereinbelow, referred to as a surface temperature) which is measured by an optical pyrometer in a state that the molten glass is flowing.

The average temperature T (although it is difficult to measure directly the average temperature of the molten glass a the outlet of the orifices of the spinner (hereinbelow referred to a temperature of glass at the outlet) during fiberizing operations, it is considered that the temperature of glass at the outlet is substantially equal to the temperature of the outer surface of the spinner), it is especially preferable that operational conditions of the temperature of the hot gas, a feeding rate of molten glass and so on are determined so that the viscosity of the molten glass is in a range of 100-5,000 poise, preferably 400-3,000 poise. The temperature in the above-mentioned range of viscosity varies depending on the composition of the glass. For instance, the temperature of the glass having the composition described below is in a range of 980° C.-1,150° C.

| | |
|---|---|
| $SiO_2$ | 61 wt % |
| $R_2O$ | 14 wt % |
| RO | 15 wt % |
| $B_2O_3$ | 6 wt % |
| $Al_2O_3$ | 4 wt % |

When the above-mentioned conditions are satisfied, the fine streams 6 of the molten glass flowing through the orifices 3 flows traversing the hot gas streams, whereby the viscosity is rapidly reduced and the fine streams are broken by the action of the hot gas streams. Although the mechanism of breaking the fine streams is not made clear, it is considered that the shape of the top portion of the fine streams 6 of the molten glass becomes unstable under the given conditions and the shape of the end portion is apt to change due to the fluctuation in temperature and the flow rate of the hot gas at the outer surface of the spinner and so on; thus causing the breaking of the fine streams.

When the temeprature of the hot gas is too low, the viscosity of the molten glass can not satisfactorily be reduced. Accordingly, the breaking of the fine streams 6 of the molten glass is insufficient, and a good result can not be obtained. When the flow rate of the hot gas is too large, a good result can not also be obtained.

Namely, the flow rate of the hot gas is large in comparison with the moving speed of the fine streams 6 of the molten glass in the horizontal direction due to the centrifugal force, whereby the fine streams 6 of the molten glass move along the streams of the hot gas, with the result that the function of the hot gas streams traversing the fine streams 6 of the molten glass can not effectively be obtained, and the breaking of the fine stream 6 can not be satisfactory. Further, the rapid reduction of the viscosity can not be obtained because of a time exposing the fine streams 6 of the molten glass to a high temperature portion is short. Accordingly, the production of glass beads of a good quality can not be achieved.

As described above, by supplying the molten glass in the spinner having an open upper surface and a large number of orifices in its circumferential surface at a rate of 0.020 kg or lower per hour with respect to a single one of the orifices, preferably in a range of 0.01–0.001 kg per hour for one orifice; by rotating the spinner at a high speed to cause the molten glass to flow through the orifices 3 by the action of a centrifugal force so as to form fine streams 6 of the molten glass having a cone-like shape; and by blowing streams of a hot gas so as to traverse the fine streams 6 of the molten glass so that the fine streams 6 of the molten glass are heated to thereby rapidly reduce the viscosity of glass, the fine streams 6 of the molten glass are broken by the action of the hot gas streams. The broken fine streams 6 of the molten glass are transformed into spherical glass beads by surface tension produced in the glass. Thus, spherical glass products having a small diameter can be produced with a high efficiency in an industrial scale without any dispersion of diameter. In this case, conditions for the operations such as the temperature and the flow rate of the hot gas are determined depending on a kind of glass to be used and the size of spherical glass porducts. Influence by the number of revolutions of the spinner is relatively small. A good result can be obtained by determining the number of the revolution to be in a range of 500 rpm–5,000 rpm, preferably, 1,000 rpm–3,000 rpm.

The above-mentioned explanation concerns a method of producing spherical glass products made of glass containing a large content of $R_2O$ which is used for producing short glass fibers. In accordance with the method of the present invention, however, spherical glass products can be produced by using E-glass having high melting temperature, Pb glass having a low melting temperature. Particularly, hollow spherical glass products can be produced by using glass which can be foamed at a high temperature proposed to produce glass balloons (hollow glass beads), for example, glass containing about 0.3% of $SO_3$.

Although description has been made as to a method of producing the spherical glass products by using molten glass, spherical products can be produced by using a heat softened material such as plastics.

When the spinner is rotated at a high speed under the above-mentioned conditions of operation, streams of a molten material flowing through the orifices of the spinner due to a centrifugal force become extremely unstable, and the streams are broken by the action of hot gas streams, whereby the broken streams are formed into small spherical products by surface tension.

EXAMPLE 1

Glass having the composition of:

| | |
|---|---|
| $SiO_2$ | 61 wt % |
| $R_2O$ | 14 wt % |
| RO | 15 wt % |
| $B_2O_3$ | 6 wt % |
| $Al_2O_3$ | 4 wt % | was operated under the following conditions:

| | |
|---|---|
| Number of orifices | 6,000 |
| Amount of molten glass per a single one of the orifices (kg/hr) | 0.005 |
| Temperature of molten glass to the spinner (°C.) | 1,250 |
| Number of revolution | 2,500 |
| Temperature of combustion gas (°C.) | 1,450 |
| Speed of combustion gas (m/sec) | 40 |

Spherical glass products having an average diameter of about ½–1/300 times as large as the diameter of the orifices formed in the spinner good stable be obtained for a long time with narrow distribution in the diameter.

EXAMPLE 2

Glass having the composition of:

| | |
|---|---|
| $SiO_2$ | 60.7 wt % |
| $R_2O$ | 14 wt % |
| RO | 15 wt % |
| $B_2O_3$ | 6 wt % |
| $Al_2O_3$ | 4 wt % |
| $SO_3$ | 0.3 wt % | was operated under the following conditions:

| | |
|---|---|
| Number of orifices | 6,000 |
| Amount of molten glass per a single one of the orifices (kg/hr) | 0.005 |
| Temperature of molten glass to the spinner (°C.) | 1,200 |
| Number of revolution | 2,500 |
| Temperature of combustion gas (°C.) | 1,250 |
| Speed of combustion gas (m/sec) | 40 |

Glass baloons having an average diameter of about ½–1/300 times as large as the diameter of the orifices formed in the spinner were stably obtained for a long time with narrow distribution of the diameter.

As the combustion gas, it is preferable to use one of a reducing atmosphere which is obtained by incomplete burning.

We claim:

1. A method for producing a spherical product from glass or plastic, said method comprising:
    (i) continuously supplying molten glass or plastic into a spinner which is a solid of revolution of a C-shaped cross section, the ends of the C extending vertically upward to form a circumferential circumscribed wall, said spinner being equipped with an upper surface extending from said wall and having a central opening in it and with a plurality of orifices formed in said circumferential wall, wherein said molten glass or plastic is continuously supplied into said spinner at a location below said orifices at a rate which will provide from 0.01 to 0.001 kg hr$^{-1}$ of melt through each orifice of said spinner upon continuous operation of the spinner;

(ii) rotating said spinner at a speed sufficient to form cones extending into fine streams of said molten glass or plastic exiting from said orifices; and (iii) passing a stream of a gas through said fine streams of molten glass or plastic at a rate of 10 to 50 meter/sec, where said gas has a temperature sufficient to reduce the viscosity of the molten glass or plastic in said streams thereby causing said fine streams to break up into a plurality of particles which then adopt a spherical shape due to the surface tension of said molten glass or plastic; and (iv) permitting said molten glass or plastic to break up into said particles and said particles to then adopt said spherical shape and permitting the resulting spheres to cool, wherein the diameter of said spheres is $\frac{1}{2}$ to 1/300 times as large as the diameter of said orifices.

2. The method of claim 1, comprising supplying molten plastic into said spinner.

3. The method of claim 1, comprising supplying molten glass into said spinner.

4. The method of claim 3, wherein said molten glass is supplied into said spinner at a temperature sufficient for said molten glass to have a viscosity of from 50 to 4,000 poise.

5. The method of claim 3, wherein said molten glass is supplied into said spinner at a temperature sufficient for said glass to have a viscosity of from 100 to 2,000 poise.

6. The method of claim 1, comprising using a combustion gas as said gas.

7. The method of claim 1, comprising passing said gas at a rate of 40 meter sec$^{-1}$ or lower.

* * * * *